United States Patent Office 3,719,986
Patented Mar. 13, 1973

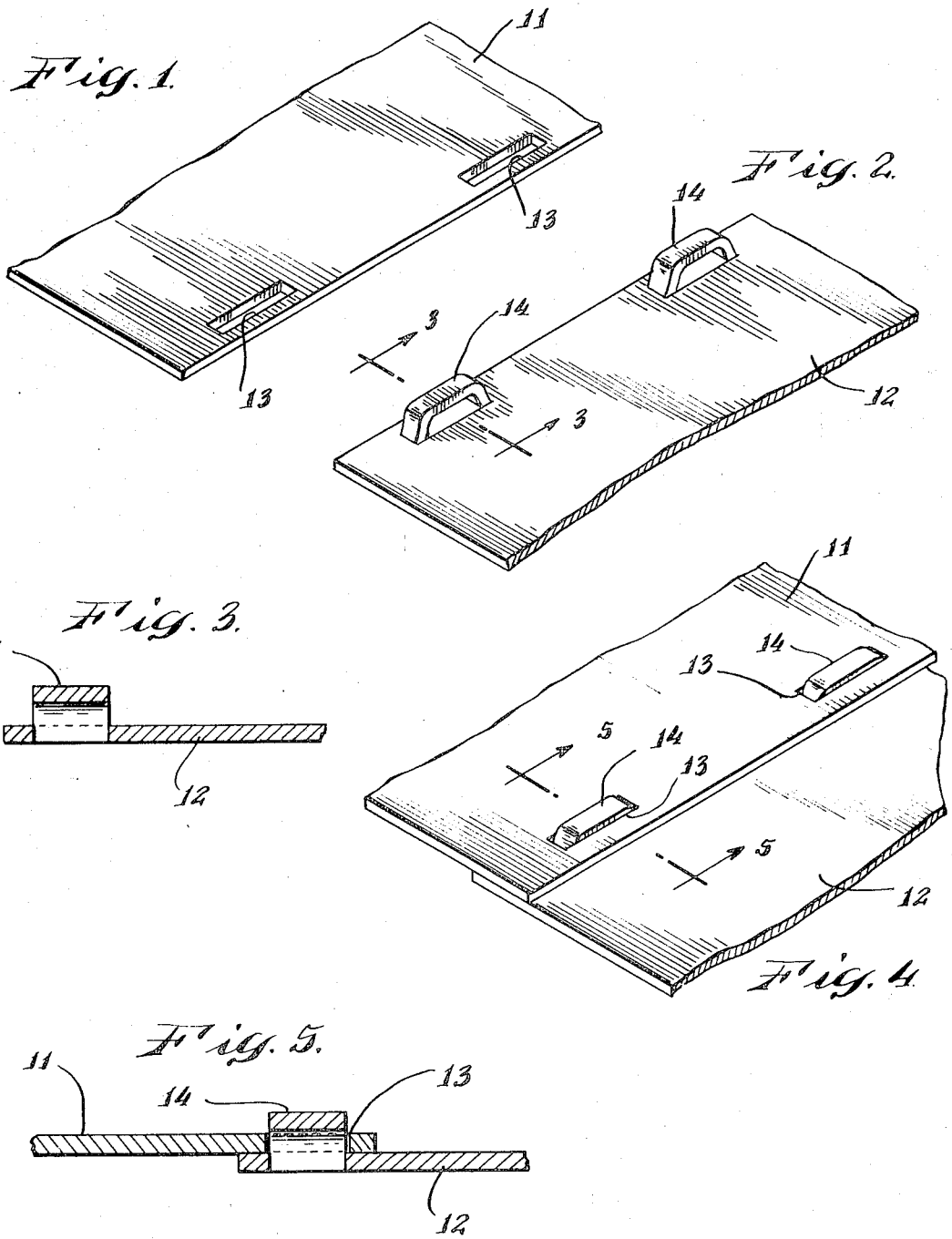

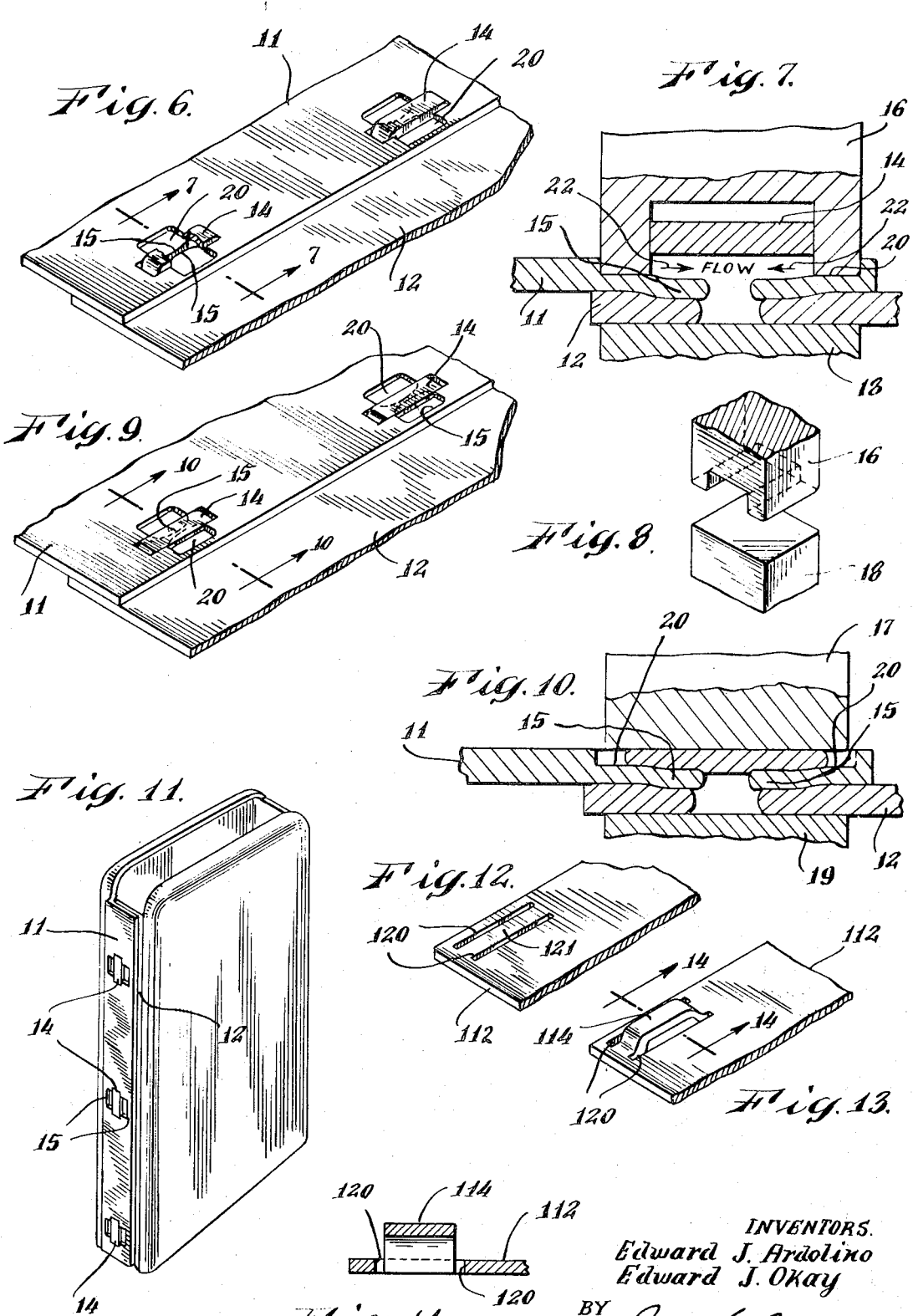

3,719,986
METHOD OF JOINING SHEET-LIKE AREAS
Edward J. Ardolino, Whiting Farm Road, Branford, Conn. 06405, and Edward J. Okay, 200 Ellis St., New Britain, Conn. 06051
Continuation-in-part of application Ser. No. 631,832, Apr. 18, 1967. This application July 13, 1970, Ser. No. 54,117
Int. Cl. B21d 39/00; B23p 11/00
U.S. Cl. 29—509                4 Claims

ABSTRACT OF THE DISCLOSURE

A first sheet area has an elongated opening pierced therein and a second sheet area has a companion arch like portion displaced therefrom of such dimensions that when the two sheets are superimposed on each other the arch portion fits into the elongated opening. Then while in this superimposed position a pair of opposite edges of the elongated opening are displaced toward each other to be engaged by the bottom of the arch when the arch is flattened out to engage the top surfaces of the displaced edges in locking engagement.

CROSS-REFERENCE TO RELATED APPLICATION

This is a continuation-in-part of application Ser. No. 631,832, filed Apr. 18, 1967, now Pat. No. 3,534,466.

This invention relates to a method of joining sheets or sheet-like areas. More particularly this invention relates to a method for joining sheet like areas wherein portions of the sheet members are displaced and formed to serve as fasteners.

Sheet materials are often joined together by means of staples, rivets, and where edges are available by folding or crimping them together. In the case of metal, the joining is effected by welding. Such foregoing methods have objectionable features depending on the materials used and the use of the joined articles. For an example, in the case of welding of metal, there is the effect of the heat on the strength of the metal and the life of the welding electrodes.

Hence an object of this invention is to provide a method which does not require welding or the use of separate fasteners such as rivets, staples or other separately applied fasteners.

Another object of this invention is to provide a method whereby components of the fastening means can be accurately located on the separate members before joining according to accurate predetermined dimensions so that when the members are united by the respectively predetermined located fastener elements, the resulting joined members conform to the desired accurate dimensions for the joined members.

Another object is to provide a strong, reliable and inexpensive method for joining sheet-like members.

Yet another object is to provide a method of fastening which presents a relatively smooth appearing and attractive surface at the point of fastening.

Another object is to provide a method of fastening in which the fastening is visible and does not require destruction of the joint to establish the fact that the fastening means is in effect.

Also another object is to provide a method for fastening in which the fastening per se can be formed to be hermetically sealed.

Other objects and a fuller understanding of the invention may be had by referring to the following description and claims, taken in conjunction with the accompanying drawings in which:

FIG. 1 is a perspective plan view of a first sheet like area having an elongated opening to receive a displaced portion of a second sheet-like area to be joined;

FIG. 2 is a perspective plan view of a second sheet like area showing a portion of the area displaced in an inverted arch like formation;

FIG. 3 is a sectional elevation taken on line 3—3 of FIG. 2 showing the displaced arch like portion;

FIG. 4 is a perspective plan view of the arch like displacement of the second area of FIGS. 2 and 1 respectively received in the elongated opening of the first area, before the displacement of the edges of FIG. 6;

FIG. 5 is an elevation on line 5—5 of FIG. 4;

FIG. 6 is a perspective plan view taken on FIG. 4 but having the opposite edges of the elongated opening displaced inwardly;

FIG. 7 is an enlarged vertical section taken on line 7—7 of FIG. 6 to which has been added a schematic view of the bifurcated die and the displacement of edges of the elongated opening to extend beneath the arch;

FIG. 8 is a schematic view in perspective of the dies used in FIG. 7;

FIG. 9 is a perspective plan view showing the elements of the fastening locked together as a completed fastening;

FIG. 10 is an enlarged vertical section taken on line 10—10 of FIG. 9 to which has been added schematic dies which lock the fastener and level it off;

FIG. 11 is a view showing the application of the novel method herein described applied to fastening the joints of a container;

FIG. 12 is a perspective plan view of a second sheet area in another embodiment of the invention;

FIG. 13 is a perspective plan view of the second sheet area of the embodiment shown in FIGS. 11 and 12; and FIG. 14 is a sectional elevation taken on line 14—14 of FIG. 13.

Referring now more particularly to the drawings:

Numerals 11 and 12 indicate sheets respectively which are to be joined together by this improved method. The material in this example is non ferrous but other materials may be used as for example other metals, fibre, plastics or the like.

While two sheets are referred to in portions of this description, it will be obvious that a single sheet formed into a hollow body so that the edges of the same sheet meet and overlap and thus are fastened by this improved method. Hence the use of the terms first sheet and second sheet would apply in this example of the single overlapped sheet.

An elongated opening 13 is formed in sheet 11 by removal of the material (FIG. 1) preferably of rectangular outline by punch and die or any suitable method. However, any suitable outline may be used be it straight or curved line or elongated or not. A companion member in the form of an arch 14 (FIGS. 2 and 3) is displaced in sheet 12 of dimensions such that it will fit snugly into the opening 13 when sheets 11 and 12 are superimposed on each other as shown in FIG. 4. When it is not important that the exact location of the first sheet relative to the second is desired a snug fit may not be necessary. While held in this position by any suitable means as for example sub dies in a press, the opposite elongated edges of opening 13 (FIGS. 6 and 7) are displaced to extend as 15 into the opening 13 and beneath the arch 14 (FIG. 7). Press dies may be used for the operation but any suitable method may be used.

While held in the above position, the arch 14 is pressed firmly against the displaced edges or sides 15 (FIGS. 7 and 9) thus securing the sheets 11 and 12 together.

FIGS. 7, 8, 9 and 10 show schematically how these last two operations may be carried out. A bifurcated die 16 and an anvil 18 are used in extending the opposite edges or sides of the elongated opening 13. Dies 17 and 19 (FIG. 10) are used to carry out the flattening and final locking operation.

FIGS. 12, 13 and 14 illustrate another embodiment of this invention whereby the forming of the arch 114 is performed in two steps, first making a pair of slots 120 in the second sheet area 112 and then displacing the area 121 between the two slots to form the desired arch 114. This embodiment of the second sheet like area 112 may be secured to a first sheet like area similar to sheet 11 formed with elongated openings 13, FIG. 1, in the following manner: the first sheet-like area is superimposed on the second sheet-like area so that the arch-like portion 114 is received in the elongated opening, and pressure is then applied to the first sheet-like area on opposite peripheral sides of the elongated opening so as to displace a portion of the material of said sheet laterally inwardly in the direction of the elongated opening and underneath the arch 114, whereby to reduce the thickness of the displaced portion of the sheet from the thickness of its undisplaced portion; and the arch-like portion is then forced downwardly against the displaced portion of reduced thickness in the first sheet area by applying pressure to the top of the arch, and thus secure the sheet-like areas into face-to-face locking engagement with each other. It will be appreciated that, in accordance with the present invention, the above-described method may be varied, for example, the protuberant arch-like portion may be formed in the second sheet-like area after the first sheet has been superimposed on the second sheet; and that pressure may be simultaneously applied to opposite peripheral sides of the elongated opening.

A series of fasteners may be employed as shown in FIG. 11 which as an example comprises a sheet metal container.

It will thus be obvious that this improved method has important advantages in fastening sheets or sheet areas together to meet precise and accurate dimensional requirements for a finished article.

By accurately locating the openings 13 in sheet or sheet area 11 and similarly locating the arch members 14 in sheet or sheet area 12, when the two sheet areas 11 and 12 are assembled and fastened, the finished article will obviously conform to the required assembled dimensions.

It will be further obvious that this invention avoids the danger of weakening the structure of the respective sheets by heating as in the case of welding and the need of supplying additional replacement electrodes.

It will also be obvious that the dimensions of opening 13 and arch 14 may be so proportioned that the fastening per se will be made hermetically sealed after the flattening and locking operation as shown in FIGS. 9 and 10.

Although we have described our invention with a certain degree of particularity, it is understood that the present disclosure has been made only by way of example and that numerous changes in the details of construction and the combination and arrangement of parts my be resorted to without departing from the spirit and scope of the invention as hereinafter claimed.

We claim:

1. The method of securing together two face engageable sheet-like areas, comprising:
    (a) removing material from the face of a first sheet-like area to form an elongated opening therethrough;
    (b) forming a pair of spaced slots in a second sheet-like area, and then displacing the portion between the slots to thereby form a protuberant arch-like portion in the second sheet-like area;
    (c) superimposing the first sheet-like area on the second sheet-like area so that the arch-like portion is received in the elongated opening;
    (d) applying pressure on the first sheet-like area on opposite peripheral sides of the elongated opening so as to deform said sides and to displace portions of the material of said first sheet-like area laterally inwardly toward said elongated opening and underneath said arch-like portion, and to reduce the thickness of said deformed portions from the thickness of the undeformed portions of said first sheet-like area; and
    (e) applying pressure to the top of the arch-like portion to force said portion downwardly against the displaced portions of reduced thickness in the first sheet-like area under the arch-like portion, and to cause the arched portion to be thinned and flow laterally into the deformed reduced thickness portions of the first sheet-like area thereby securing the two sheet-like area into face-to-face locking engagement with each other, whereby the top surface of said arch-like portion is flush with the top surface of the undeformed portions of the first sheet-like area.

2. In the method of claim 1 wherein pressure is applied simultaneously to opposite peripheral sides of the elongated opening.

3. The method of securing together two face-engageable sheet-like areas comprising:
    (a) removing material from the face of a first sheet-like area to form an elongated opening therethrough;
    (b) forming a pair of spaced slots in a second sheet-like area which would substantially align with the sides of said elongated opening when said second sheet-like area is superimposed on said first sheet-like area;
    (c) superimposing said second sheet-like area on said first sheet-like area to effect the alignment of the slots with the sides of the elongated opening;
    (d) applying pressure to said second sheet-like area to force a portion thereof lying between said slots into and through said elongated openings in the form of an arch;
        (1) said arch-like portion having both ends integral with said second sheet-like area;
    (e) applying pressure to the first sheet-like area on opposite peripheral sides of the elongated opening so as to deform said sides and to displace portions of the material of said first sheet-like area laterally inwardly toward said elongated opening and underneath said arch-like portion and to reduce the thickness of said deformed portions from the thickness of the undeformed portions of said first sheet-like area; and
    (f) applying pressure to the top of the arch-like portion to force said portion downwardly against the displaced portions of reduced thickness in the first sheet-like area under the arch-like portion, and to cause the arched portion to be thinned and flow laterally into the deformed reduced thickness portions thereby securing the two sheet-like areas into face-to-face locking engagement with each other, whereby the outside surface of said arch-like portion is flush with the outside surface of the undeformed portions of the first sheet-like area.

4. In the method of claim 3 wherein pressure is applied simultaneously to opposite peripheral sides of the elongated opening.

References Cited

UNITED STATES PATENTS

| 512,021 | 1/1894 | Gould | 29—509 UX |
|---|---|---|---|
| 1,675,328 | 7/1928 | Borland | 29—509 UX |
| 1,784,256 | 12/1930 | Stout | 29—521 |
| 2,254,558 | 9/1941 | Williams | 287—189.36 D |

FOREIGN PATENTS

| 492,241 | 2/1930 | Germany | 29—509 |

CHARLIE T. MOON, Primary Examiner

U.S. Cl. X.R.

29—521; 113—116 FF; 287—189.36 D